US012689635B2

(12) United States Patent
Kieffer et al.

(10) Patent No.: US 12,689,635 B2
(45) Date of Patent: Jul. 21, 2026

(54) SYSTEM AND METHOD FOR ELECTRONIC MESSAGE DATA ANALYSIS AND NEUTRALIZATION VIA MACHINE LEARNING

(71) Applicant: BANK OF AMERICA CORPORATION, Charlotte, NC (US)

(72) Inventors: Malinda Kieffer, Chillicothe, MO (US); Naveen Adala, Charlotte, NC (US); Kevin A. Delson, Woodland Hills, CA (US); Kirk A. Hawrysio, Oak Point, TX (US); Anne M. Matrone, Staten Island, NY (US); Noel Arnaldo Medina, Katy, TX (US); Thomas D. Morris, Middleburg, FL (US); Pankaj Nagpal, Charlotte, NC (US); Owen Nelson, Farmingdale, NY (US); Robert R. Rosseland, Jr., Huntersville, NC (US); John David Weber, Lake Saint Louis, MO (US); Tanya A. Wilson, Newark (DE)

(73) Assignee: BANK OF AMERICA CORPORATION, Charlotte, NC (US)

( * ) Notice: Subject to any disclaimer, the term of this patent is extended or adjusted under 35 U.S.C. 154(b) by 6 days.

(21) Appl. No.: 18/883,470

(22) Filed: Sep. 12, 2024

(65) Prior Publication Data

US 2026/0075064 A1 Mar. 12, 2026

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC ........................ H04L 63/1416; H04L 63/1441
See application file for complete search history.

(56) References Cited

U.S. PATENT DOCUMENTS

| | | | | |
|---|---|---|---|---|
| 7,287,060 B1 * | 10/2007 | McCown | .............. | H04L 51/212 |
| | | | | 707/999.001 |
| 7,680,886 B1 * | 3/2010 | Cooley | ................. | H04L 51/212 |
| | | | | 709/206 |
| 9,123,027 B2 | 9/2015 | Srivastava | | |
| 10,044,656 B2 | 8/2018 | Oliver | | |
| 10,581,898 B1 | 3/2020 | Singh | | |

(Continued)

*Primary Examiner* — Viet D Vu
(74) *Attorney, Agent, or Firm* — Moore & Van Allen PLLC; Nicholas C. Russell

(57) ABSTRACT

Systems, computer program products, and methods are described herein for electronic message data analysis and neutralization via machine learning. The present disclosure includes receiving message data at a gateway server, analyzing, using a coarse message data filter, the message data, receiving, upon a condition where the message data does not meet the at least one coarse message data filtering condition, the message data in a categorization engine, scoring, using the categorization engine, the message data based on contents of the message data, categorizing the message data in a category of malicious or non-malicious, applying metadata to the message data based on the category, transmitting the message data to an endpoint device having an email exchange application with a malicious email filtering plug-in, and displaying the message data in a predetermined folder of the email exchange application based on the category.

12 Claims, 6 Drawing Sheets

(56)        References Cited

U.S. PATENT DOCUMENTS

| | | | |
|---|---|---|---|
| 10,764,316 | B2 | 9/2020 | Maylor |
| 11,050,698 | B1 | 6/2021 | Batchu |
| 11,258,811 | B2 | 2/2022 | Hall |
| 12,015,641 | B1 | 6/2024 | Horesh |
| 12,101,294 | B2 | 9/2024 | Gernhardt |
| 2005/0102366 | A1* | 5/2005 | Kirsch ................. G06Q 10/107 |
| | | | 709/229 |
| 2008/0066180 | A1 | 3/2008 | Repasi |
| 2010/0017869 | A1 | 1/2010 | Chauhan |
| 2013/0333026 | A1* | 12/2013 | Starink ............... G06F 16/9558 |
| | | | 726/22 |
| 2015/0007312 | A1* | 1/2015 | Pidathala ........... H04L 63/1433 |
| | | | 726/22 |
| 2019/0266242 | A1 | 8/2019 | Arumugam |
| 2022/0141252 | A1 | 5/2022 | Shi |
| 2022/0188411 | A1 | 6/2022 | Lee |
| 2024/0114041 | A1 | 4/2024 | Sapountzis |

* cited by examiner

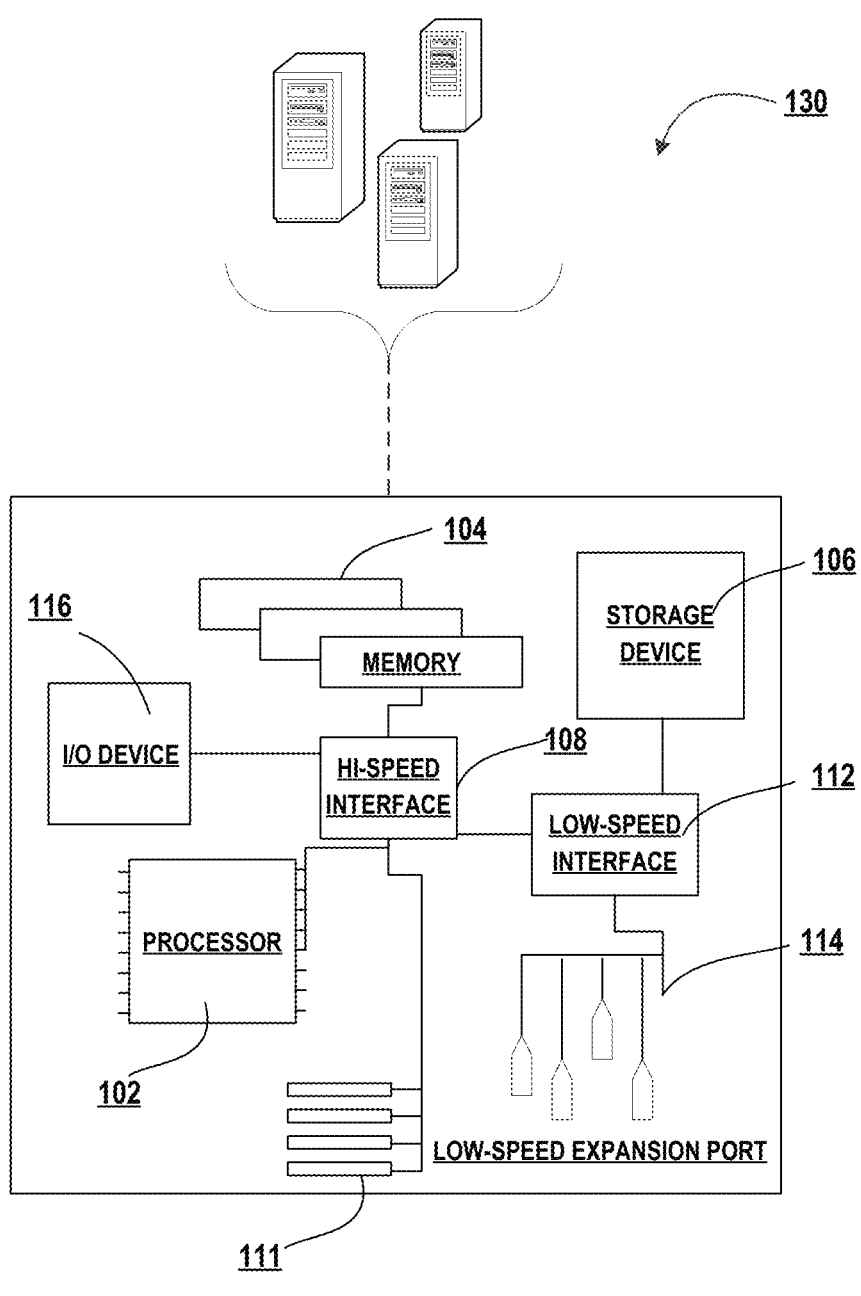
*FIG.* 1B

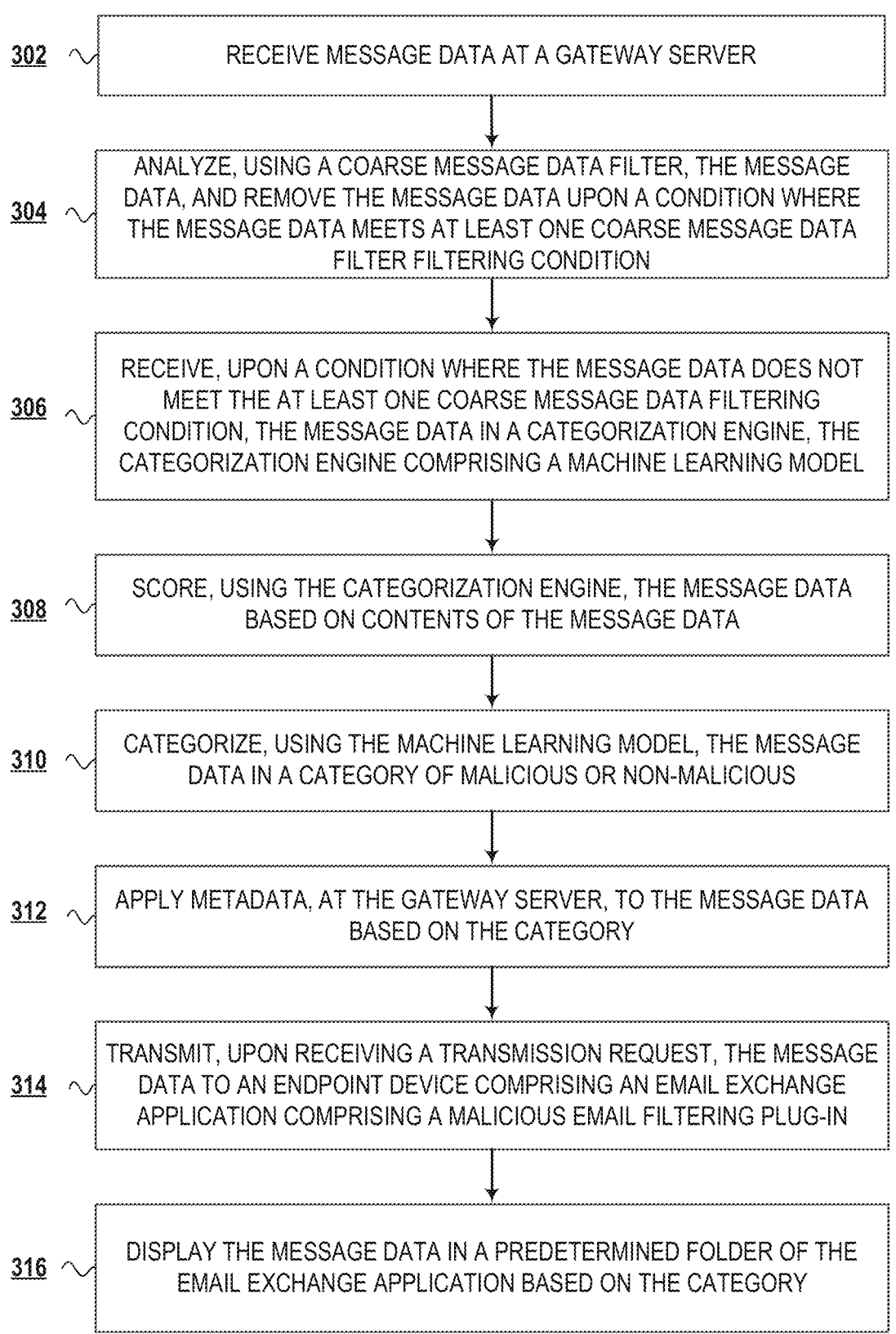

302    RECEIVE MESSAGE DATA AT A GATEWAY SERVER

304    ANALYZE, USING A COARSE MESSAGE DATA FILTER, THE MESSAGE DATA, AND REMOVE THE MESSAGE DATA UPON A CONDITION WHERE THE MESSAGE DATA MEETS AT LEAST ONE COARSE MESSAGE DATA FILTER FILTERING CONDITION

306    RECEIVE, UPON A CONDITION WHERE THE MESSAGE DATA DOES NOT MEET THE AT LEAST ONE COARSE MESSAGE DATA FILTERING CONDITION, THE MESSAGE DATA IN A CATEGORIZATION ENGINE, THE CATEGORIZATION ENGINE COMPRISING A MACHINE LEARNING MODEL

308    SCORE, USING THE CATEGORIZATION ENGINE, THE MESSAGE DATA BASED ON CONTENTS OF THE MESSAGE DATA

310    CATEGORIZE, USING THE MACHINE LEARNING MODEL, THE MESSAGE DATA IN A CATEGORY OF MALICIOUS OR NON-MALICIOUS

312    APPLY METADATA, AT THE GATEWAY SERVER, TO THE MESSAGE DATA BASED ON THE CATEGORY

314    TRANSMIT, UPON RECEIVING A TRANSMISSION REQUEST, THE MESSAGE DATA TO AN ENDPOINT DEVICE COMPRISING AN EMAIL EXCHANGE APPLICATION COMPRISING A MALICIOUS EMAIL FILTERING PLUG-IN

316    DISPLAY THE MESSAGE DATA IN A PREDETERMINED FOLDER OF THE EMAIL EXCHANGE APPLICATION BASED ON THE CATEGORY

*FIG.* 3A

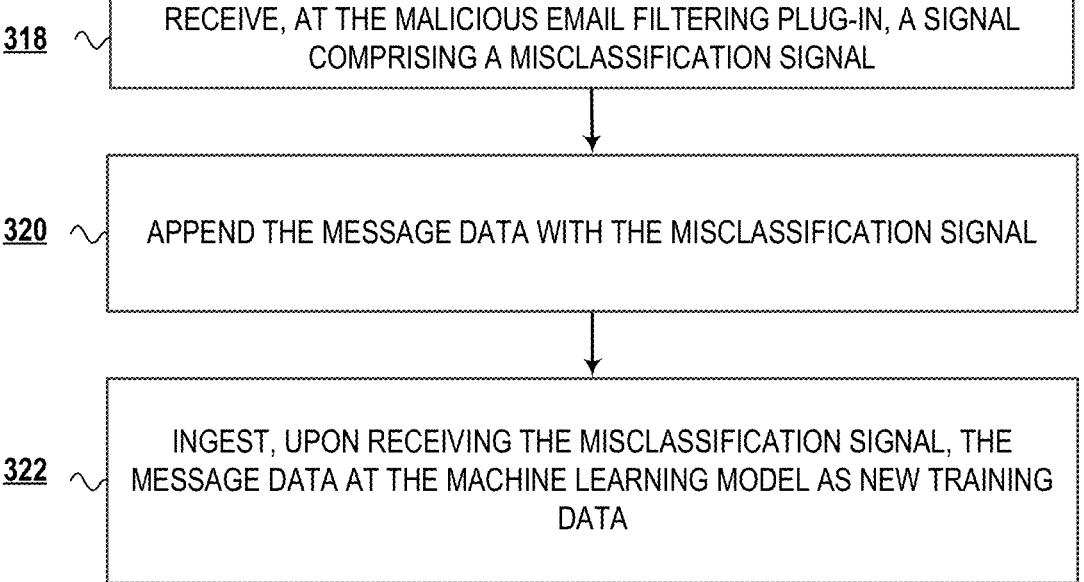
318   RECEIVE, AT THE MALICIOUS EMAIL FILTERING PLUG-IN, A SIGNAL COMPRISING A MISCLASSIFICATION SIGNAL
320   APPEND THE MESSAGE DATA WITH THE MISCLASSIFICATION SIGNAL
322   INGEST, UPON RECEIVING THE MISCLASSIFICATION SIGNAL, THE MESSAGE DATA AT THE MACHINE LEARNING MODEL AS NEW TRAINING DATA
*FIG.* 3B

SYSTEM AND METHOD FOR ELECTRONIC MESSAGE DATA ANALYSIS AND NEUTRALIZATION VIA MACHINE LEARNING

TECHNOLOGICAL FIELD

Example implementations of the present disclosure relate to a system and method for electronic message data analysis and neutralization via machine learning.

BACKGROUND

Credential harvesting and spam emails have become increasingly prevalent, with malfeasant actors continuously evolving their tactics to deceive recipients. These malicious emails often mimic legitimate communications, making it challenging for users to distinguish between authentic and deceptive messages. Recent developments have seen these techniques become more sophisticated by leveraging advanced social engineering and technological methods. As a result, users are often unaware of the latest credential harvesting strategies, significantly increasing the likelihood of data breaches and reputational damages. Accordingly, there is a need for a system and method for electronic message data analysis and neutralization via machine learning to provide for enhanced monitoring, detection, neutralization, and reporting of such credential harvesting and spam emails.

BRIEF SUMMARY

Systems, methods, and computer program products are provided for electronic message data analysis and neutralization via machine learning.

In one aspect, a system for electronic message data analysis and neutralization via machine learning may be presented. The system may include a processing device, and a non-transitory storage device containing instructions, when executed by the processing device, the instructions cause the processing device to perform the steps of receive message data at a gateway server, analyze, using a coarse message data filter, the message data, and remove the message data upon a condition where the message data meets at least one coarse message data filter filtering condition, receive, upon a condition where the message data does not meet the at least one coarse message data filtering condition, the message data in a categorization engine, the categorization engine having a machine learning model, score, using the categorization engine, the message data based on contents of the message data, categorize, using the machine learning model, the message data in a category of malicious or non-malicious, apply metadata, at the gateway server, to the message data based on the category, transmit, upon receiving a transmission request, the message data to an endpoint device having an email exchange application having a malicious email filtering plug-in, and display the message data in a predetermined folder of the email exchange application based on the category.

In some implementations, the instructions may further cause the processing device to perform the steps of receive, at the malicious email filtering plug-in, a signal having a misclassification signal, append the message data with the misclassification signal, and ingest, upon receiving the misclassification signal, the message data at the machine learning model as new training data.

In some implementations, the machine learning model may be configured to further categorize the message data categorized as malicious as being in a first category or a second category.

In some implementations, further categorizing the message data categorized as malicious as being in the first category or the second category may include comparing a similarity distance to a predetermined threshold for the first category and the second category.

In some implementations, upon a condition where the message data may be in the first category, the categorization engine removes hyperlinks in the message data.

In some implementations, upon a condition where the message data may be in the second category, the categorization engine alters hyperlinks in the message data.

In some implementations, upon clicking of the altered hyperlink, the instructions further cause the processing device to perform the steps of display a warning message via the malicious email filtering plug-in.

In another aspect, a computer program product for electronic message data analysis and neutralization via machine learning is presented, the computer program product having a non-transitory computer-readable medium having code causing an apparatus to receive message data at a gateway server, analyze, using a coarse message data filter, the message data, and remove the message data upon a condition where the message data meets at least one coarse message data filter filtering condition, receive, upon a condition where the message data does not meet the at least one coarse message data filtering condition, the message data in a categorization engine, the categorization engine having a machine learning model, score, using the categorization engine, the message data based on contents of the message data, categorize, using the machine learning model, the message data in a category of malicious or non-malicious, apply metadata, at the gateway server, to the message data based on the category, transmit, upon receiving a transmission request, the message data to an endpoint device having an email exchange application having a malicious email filtering plug-in, and display the message data in a predetermined folder of the email exchange application based on the category.

In some implementations, the code may further cause the apparatus to receive, at the malicious email filtering plug-in, a signal having a misclassification signal, append the message data with the misclassification signal, and ingest, upon receiving the misclassification signal, the message data at the machine learning model as new training data.

In some implementations, the machine learning model may be configured to further categorize the message data categorized as malicious as being in a first category or a second category.

In some implementations, further categorizing the message data categorized as malicious as being in the first category or the second category may include comparing a similarity distance to a predetermined threshold for the first category and the second category.

In some implementations, upon a condition where the message data may be in the first category, the categorization engine removes hyperlinks in the message data.

In some implementations, upon a condition where the message data may be in the second category, the categorization engine alters hyperlinks in the message data.

In some implementations, upon clicking of the altered hyperlink, the code further causes the apparatus to display a warning message via the malicious email filtering plug-in.

In yet another aspect, a method for electronic message data analysis and neutralization via machine learning is presented, the method including receiving message data at a gateway server, analyzing, using a coarse message data filter, the message data, and remove the message data upon a condition where the message data meets at least one coarse message data filter filtering condition, receiving, upon a condition where the message data does not meet the at least one coarse message data filtering condition, the message data in a categorization engine, the categorization engine having a machine learning model, scoring, using the categorization engine, the message data based on contents of the message data, categorizing, using the machine learning model, the message data in a category of malicious or non-malicious, applying metadata, at the gateway server, to the message data based on the category, transmitting, upon receiving a transmission request, the message data to an endpoint device having an email exchange application having a malicious email filtering plug-in, and displaying the message data in a predetermined folder of the email exchange application based on the category.

In some implementations, the method may further include receiving, at the malicious email filtering plug-in, a signal having a misclassification signal, appending the message data with the misclassification signal, and ingesting, upon receiving the misclassification signal, the message data at the machine learning model as new training data.

In some implementations, the machine learning model may be configured to further categorize the message data categorized as malicious as being in a first category or a second category.

In some implementations, further categorizing the message data categorized as malicious as being in the first category or the second category may include comparing a similarity distance to a predetermined threshold for the first category and the second category.

In some implementations, upon a condition where the message data may be in the first category, the categorization engine removes hyperlinks in the message data.

In some implementations, upon a condition where the message data may be in the second category, the categorization engine alters hyperlinks in the message data.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
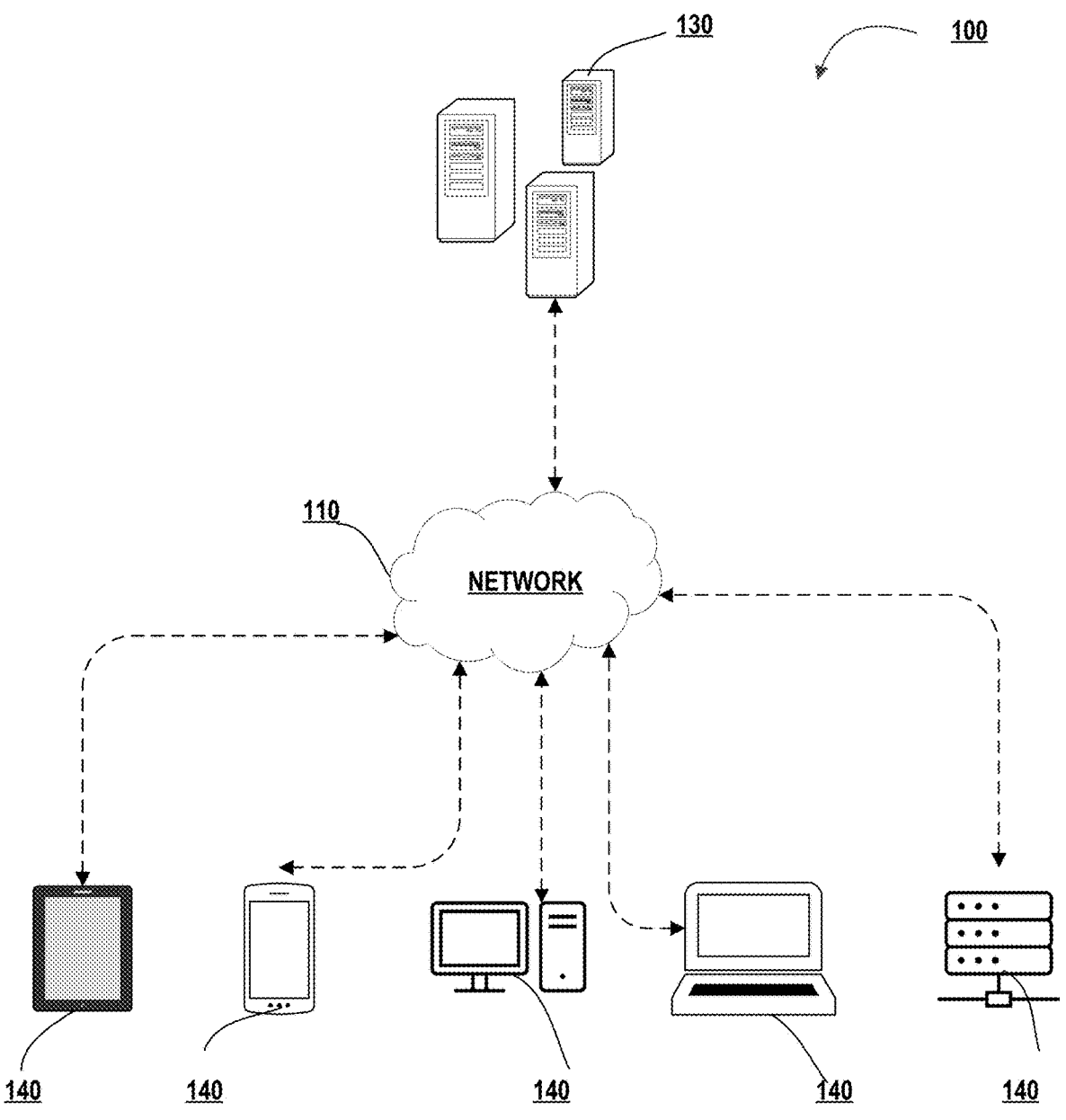
Figure 1C:
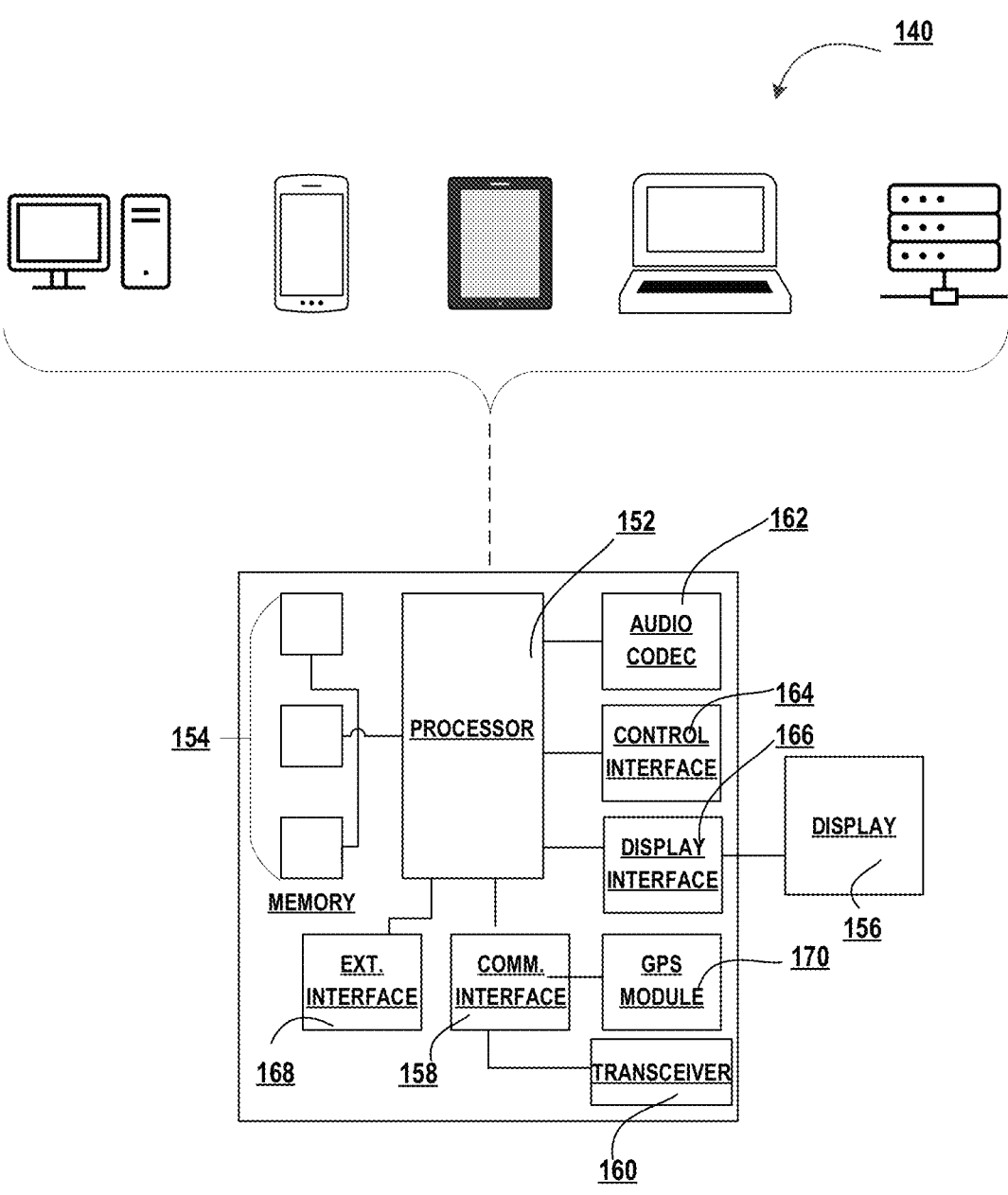
Figure 2:
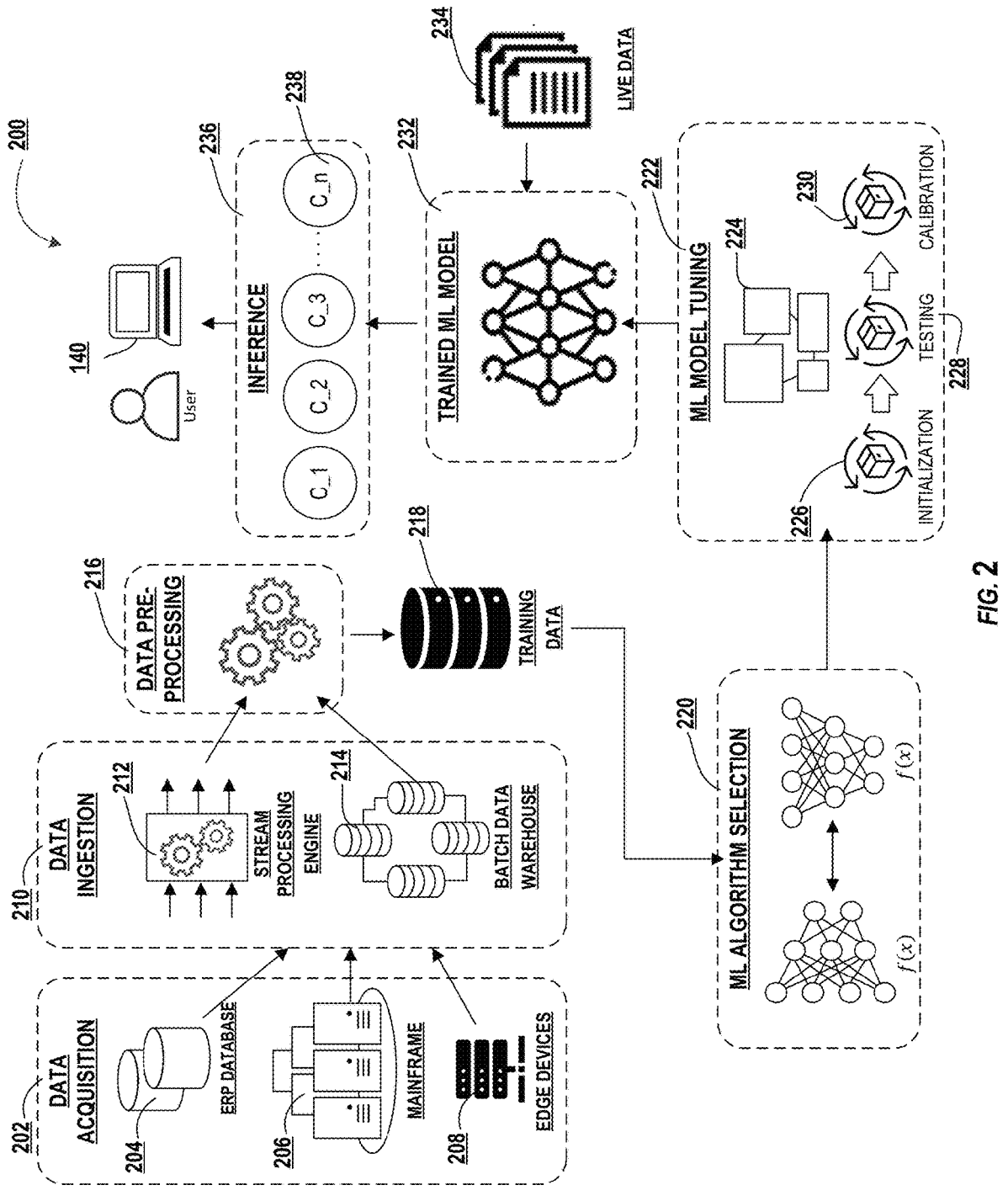

FIGS. 1A-1C illustrate technical components of an exemplary distributed computing environment for electronic message data analysis and neutralization via machine learning, in accordance with an implementation of the disclosure;

FIG. 2 illustrates an exemplary machine learning model subsystem architecture, in accordance with an implementation of the disclosure; and FIGS. 3A-3B illustrate a process flow for electronic message data analysis and neutralization via machine learning, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system. In some implementations, an engine may implement a machine learning model to perform functions as a foundation for the larger piece of software that drives the functionality of the software. The machine learning model for any given engine may be self-contained (e.g., without interaction with other engines), or the machine learning model may be shared across one or more engines. In other words, some implementations of the larger piece of software many implement multiple machine learning models to perform functions of the various engines. In other implementations, a single machine learning model may be shared across one or more engines to perform the functions attributed thereto as described herein.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that an element matches a predetermined criterion, including that a threshold has been met, passed, exceeded, and so on.

The technical problem solved herein addresses the persistent and evolving nature of credential harvesting and spam emails. This evolving nature presents a significant technical problem that has yet to be adequately addressed. Despite numerous advancements in cybersecurity measures, existing solutions have struggled to keep pace with the increasingly sophisticated tactics employed by malicious actors. Traditional filtering methods and user training programs have proven inadequate in mitigating the likelihood of breaches, as attackers continually refine their approaches to bypass detection systems and take advantage of human vulnerabilities. This long-standing issue underscores the urgent need for a more robust, adaptive solution capable of effectively identifying and neutralizing these ever-changing threats to protect users and organizations.

Current solutions to the problem of credential harvesting and spam emails primarily include spam filters, anti-credential-harvesting software, and user education programs. Spam filters, while effective at blocking obvious threats, often fail to detect more sophisticated credential harvesting attempts that mimic legitimate emails. Anti-credential-harvesting software provides an additional layer of protection but is frequently reactive, relying on known threat signatures that can be easily circumvented by novel tactics. User education programs aim to increase awareness and caution among email users; however, they are limited by the constantly changing nature of credential harvesting techniques, leading to a knowledge gap that attackers take advantage of. Consequently, these solutions, while valuable, fall short in comprehensively addressing the dynamic and evolving landscape of email-based threats.

Addressing these challenges requires the establishment of a system and method for electronic message data analysis and neutralization via machine learning. Such a system provides for the implementation of a categorization engine having a machine learning model to score and categorize message data (either alone, or in combination with a coarse message data filter). Upon the transmitting of the message data to an email exchange application, the message data may be accompanied by metadata to sort the message data into different folders, modified so as to prevent the inadvertent selection of hyperlinks, modified to route any selection of hyperlinks to an intermediate message, and so forth, depending on the output of the machine learning model. The machine learning model may also leverage its ability for learning to receive instructions from the email exchange application if any misclassification occurs, for example in instances where a novel type of malicious message data is being implemented, not yet known by the machine learning model to be malicious.

To do so, the system may receive message data at a gateway server, then analyze the message data using a coarse message data filter, which may act as a first line of defense against malicious message data. The coarse message data filter may remove message data based on predetermined conditions. Message data that does not get filtered using the coarse message data filter may be provided to a categorization engine, which may contain a machine learning model. The categorization engine may score the message data based on contents therein, and thereafter categorize the message data as being malicious or non-malicious. Based on this categorization, metadata may be generated and/or applied to the message data at the gateway server. Additionally, or alternatively, the message data may be modified in such a way as to remove hyperlinks or modify hyperlinks, depending on the categorization. At an endpoint device, a user may request message data associated with the user (i.e., to read the message data). Thus, the system may transmit the message data to the endpoint device, where the endpoint device includes an email exchange application with a malicious email filtering plug-in in operable communication with the categorization engine (and specifically, the machine learning model). Based on the categorization, the message data may be displayed in a predetermined folder. In instances where the message data has been categorized incorrectly, the system may receive a misclassification signal from the malicious email filtering plug-in, which appends the message data with the misclassification signal (e.g., metadata). The machine learning model may then ingest the message data that is associated with a misclassification signal and use this message data as training data to refine the machine learning model (e.g., on an ongoing basis).

What is more, the present disclosure provides a technical solution to a technical problem. As described herein, the technical problem includes the inability of existing solutions to effectively detect and neutralize the continuously evolving and sophisticated tactics used in credential harvesting and spam emails. The present disclosure embraces an improvement over existing solutions by allowing for detecting and neutralizing malicious message data (i) with fewer steps to achieve the solution (e.g., directly providing feedback to a machine learning model through an email exchange program that allows for identification of similar message data without intervention), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., by using a machine learning model to analyze message data and make predictions of its categorization instead of using more coarse filtering methods), (iii) removing manual input and waste from the implementation of the solution, thus improving speed and efficiency of the process and conserving network resources (e.g., avoiding the manual reprogramming or re-defining of coarse filters for filtering message data, and instead leveraging training data to improve a machine learning model), (iv) determining an optimal amount of resources that need to be used to implement the solution, thus reducing network traffic and load on existing network resources (e.g., minimizing redundant efforts in improvement of malicious message data detection). In other words, the solution may bypass a series of steps previously implemented, thus further conserving network resources. Furthermore, the technical solution described herein uses a rigorous, computerized process to perform specific tasks and/or activities that were not previously performed.

FIGS. 1A-1C illustrate technical components of an exemplary distributed computing environment 100 for electronic message data analysis and neutralization via machine learning, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, input devices such as resource transfer terminals, electronic resource transfer units, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processing device 102, memory 104, input/output (I/O) device 116, and a storage device 106. The system 130 may also include a high-speed interface 108 connecting to the memory 104, and a low-speed interface 112 connecting to a low-speed bus 114 and a storage device 106. Each of the components 102, 104, 108, 110, and 112 may be operatively coupled to one another using various buses and may be mounted on a common motherboard or in other manners as appropriate. As described herein, the processing device 102 may include a number of subsystems to execute the portions of processes described herein. Each subsystem may be a self-contained component of a larger system (e.g., system 130) and capable of being configured to execute specialized processes as part of the larger system.

The processing device 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processing devices, along with multiple memories, and/or I/O devices, to execute the processes described herein. In other words, as used herein, a "processing device" means one processing device (e.g., a microprocessor) that performs the defined functions or a plurality of processing devices (e.g., microprocessors) that collectively perform defined functions such that the execution of the individual defined functions may be divided amongst such processing devices.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processing device 102.

The high-speed interface 108 manages bandwidth-intensive operations for the system 130, while the low-speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processing device 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processing device 152 is configured to execute instructions within the endpoint device(s) 140, including instructions stored in the memory 154, which in one implementation includes the instructions of an application that may perform the functions disclosed herein, including certain logic, data processing, and data storing functions. The processing device may be implemented as a chipset of chips that include separate and multiple analog and digital processors. The processing device may be configured to provide, for example, for coordination of the other components of the endpoint device(s) 140, such as control of user interfaces, applications run by endpoint device(s) 140, and wireless communication by endpoint device(s) 140.

The processing device 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processing device 152. In addition, an external interface 168 may be provided in communication with processing device 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer- or machine-readable medium, such as the memory 154, expansion memory, memory on processing device 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning model subsystem architecture 200, in accordance with an implementation of the disclosure. The machine learning subsystem 200 may include a data acquisition engine 202, data ingestion engine 210, data pre-processing engine 316, machine learning model tuning engine 222, and inference engine 236.

The data acquisition engine 202 may identify various internal and/or external data sources to generate, test, and/or integrate new features for training the machine learning model. These internal and/or external data sources 204, 206, and 208 may be initial locations where the data originates or where physical information is first digitized. The data acquisition engine 202 may identify the location of the data and describe connection characteristics for access and retrieval of data. In some implementations, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some implementations, the these data sources 204, 206, and 208 may include Enterprise Resource Planning (ERP) databases or protocol databases that host data related to day-to-day enterprise activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of network resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points. As will be understood in view of the present disclosure, training data 218 may additionally, or alternatively, be provided from a third party, having been generated as synthetic data.

The machine learning model tuning engine 222 may be used to train a machine learning model to form a trained machine learning model 232 using the training data 218 to make predictions or decisions without explicitly being programmed to do so. The machine learning model 232 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic)

that are configured to self-adjust and perform better as they are exposed to more data. To this extent, machine learning algorithms can adjust their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the machine learning model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the machine learning model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical enterprise decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It shall be understood that the implementation of the machine learning subsystem 200 illustrated in FIG. 2 is exemplary and that other implementations may vary. As another example, in some implementations, the machine learning subsystem 200 may include more, fewer, or different components.

FIGS. 3A-3B illustrate a process flow for electronic message data analysis and neutralization via machine learning, in accordance with an implementation of the disclosure. At block 302, the system 130 receives message data at a gateway server. It shall be appreciated that all message data, including that which includes text, images, video, or other multimedia content, can be processed at the gateway server using the process described herein. The message data may also include voice recordings, sensor data from IoT devices, encrypted communications, and structured data such as JSON or XML files. In some implementations, message data may include log files, real-time streaming data, telemetry data, and social media feeds. Additionally, the system 130 may receive message data in the form of email attachments, API responses, and data packets from network monitoring tools.

This message data may originate from any number of sources, including external sources (internet) or internal sources (intranet). While the present disclosure may refer to message data in the context of email messages, it shall also be appreciated that the present disclosure may also be applied to other forms of message data, including internet messages from internet messaging services, SMS and MMS through wireless telephone communications, or the like. Indeed, while a "gateway server" may be a traditional gateway server intermediary between an email client and a backend system, the "gateway server" may also act as an intermediary between a messaging client and a backend system, a SMS client and a backend system, and so forth.

In some implementations of the disclosure, the gateway server is system 130, and as such, the processes, engines, and the like, described hereinafter, may operate on the system 130.

At block 304, the system 130 may analyze, using a coarse message data filter, the message data. The coarse data filter may be implemented at the gateway server, or in some implementations at a server that receives message data prior to reaching the gateway server. The coarse data filter may be a filtering algorithm that detects malicious message data based on known attributes. For example, a database of keywords may be provided to the coarse data filter, a database of correspondence addresses (email addresses, phone numbers, usernames, etc.), a database of domain names, etc., all of which have previously been determined to present a high likelihood of malicious activity. As one example, the coarse message data filter may be defined to filter out any message data containing "Term A" and "Term B."

By "filter out," reference is made to the action taken to quarantine, delete, or otherwise isolate specific message data, information, or elements deemed irrelevant, undesirable, or non-compliant, thereby preventing their inclusion in the subsequent processing, analysis, or utilization phases. This isolating action typically involves redirecting the filtered data to a designated storage location or quarantine database, where it is held separately from the main message data set at the gateway server. The quarantined data may be flagged for further review, archived for record-keeping purposes, or permanently deleted, depending on the specific protocols in place. Accordingly, should a condition be met where message data meets one or more of the "known attributes" (i.e., filtering conditions) as described previously, the system 130 may remove the message data.

Continuing at block 306, the system 130 may receive the message data in a categorization engine, upon a condition where the message data does not meet the at least one coarse message data filtering condition. Having filtered out any message data that meets the filtering conditions of the coarse data filter, the remaining message data may be received by a categorization engine in order to further analyze and categorize the message data. In some implementations, the categorization engine may include a trained machine learning model 232. This machine learning model 232 may be trained using message data known to be malicious (e.g., containing malicious links, attachments, messages, sender addresses or domains, and so forth). The machine learning model 232 may similarly be trained using message data known to be benign, which may include links determined to be safe, trusted senders and sender domains, attachments, and so forth. Each of these types of message data may be labeled and utilized for the training of the machine learning model 232. To improve the effectiveness of the machine learning model 232, the machine learning model may undergo hyperparameter tuning, data preprocessing, feature engineering, cross-validation, regularization, data augmentation, or the like.

In this way, upon the receipt of message data into the trained machine learning model 232 of the categorization engine, the machine learning model 232 predicts the category into which the newly received message data should be categorized. The prediction may be based on a predicted score of a scoring system, as will be described hereinafter. As an example, message data may be received by the machine learning model 232, provided a score on a predetermined scale, with one end of the scale being the highest probability in the message data being malicious, while the other end of the scale is the highest probability in the message data being non-malicious. Predetermined thresholds may be set such that if the machine learning model 232 scores the message data, any message data above or below the predetermined threshold may be considered malicious, while any message data scored in the remainder of the scale is considered non-malicious.

Accordingly, at block 308, the system 130 may score the message data based on contents of the message data using the categorization engine. For example, a scale of 1-10 may be provided, where a "10" represents the highest probability that the machine learning model 232 has determined that that the message data is malicious, while a "1" represents the highest probability that the machine learning model 232 has determined that that the message data is non-malicious. A predetermined threshold may be set such that a "5" represents the cutoff between message data being considered malicious, where anything from "5" to "10" is categorized as being malicious, while anything from "1" to "5" is considered non-malicious.

While the foregoing is described as a part of a categorization (i.e., classification) engine, it shall be appreciated that other machine learning model types may be implemented. As described, categorization engines may directly assign a probability score to each class—malicious or non-malicious—based on the input features. These models produce a discrete output, typically a binary value, indicating the predicted class (e.g., above or below a threshold). Alternatively, regression models may be implemented, which can predict a continuous score that represents the likelihood of an input being malicious. This score can then be thresholded with a predetermined threshold to make a binary classification. Alternatively, ranking models may be implemented, which score each input based on its relevance or likelihood of being malicious and can be used to prioritize items for further analysis, sorting them from most to least likely malicious.

Accordingly, using any of the foregoing categorization methods, at block 310, the system 130 may categorize the message data in a category of malicious or non-malicious using the machine learning model 232. In other words, one category may be specific to message data believed to be malicious, while another category may be specific to message data believed to be non-malicious.

In some implementations, the machine learning model 232 may further categorize the message data categorized as malicious as being in a first category or a second category. In other words, instead of simply grouping all message data deemed malicious into a single category, these allegedly-malicious message data may be separated into two categories, such that members of each category may be treated differently by the system 130.

As one example implementation, it may be desired that in one category, any hyperlink (i.e., "links") in the message data within that category is removed (i.e., "disabled"). What was a hyperlink may be converted to unformatted text, such that the URL or the link text description still remains, but the hyperlink is no longer "clickable." Additionally, or alternatively, images or graphics in the message data that are clickable may be reformatted to remove their respective hyperlink(s). As a result of the foregoing, inadvertent clicking of the hyperlink by the user receiving the message data is prevented. In other implementations, hyperlinks may be deleted entirely, either by removing the text associated with the hyperlink from the message data, or by removing the graphic(s) or image(s) that otherwise serve as hyperlinks. In some implementations, such removal of hyperlinks may be reserved for the category of malicious message data with the highest probability of being malicious.

In other implementations, the system 130 may alter the hyperlinks in the message data upon determining that the message data is in one category. Hyperlinks may be replaced (i.e., altered) by mechanisms that execute code directly on the endpoint device 140, as will be described herein (e.g., in conjunction with an email exchange application and/or a malicious email filtering plug-in of the email exchange application). By doing so, subsequent clicking of links may initiate data retrieval, content rendering, or automated navigation. Additionally, or alternatively, the hyperlink(s) may be altered by substituting the hyperlink(s) with intermediary links that redirect users through one or more servers before reaching the final destination, enabling tracking, content filtering, or dynamic destination adjustments based on user behavior or other variables.

Indeed, it shall be appreciated that in view of the foregoing, some categories (e.g., a first category or a second category) may be reserved for message data that has been determined to have a high probability of being malicious—e.g., a category where hyperlinks are removed entirely—while other categories (e.g., a first category or a second category) may be reserved for message data that is still determined to likely be malicious but above or below the predetermined probability threshold, and as such may be treated differently than the other category, for example, by altering the hyperlink(s) in the message data.

Having been deemed malicious, the system 130 may use similarity distance(s) to determine whether the message data should be placed in the first category or the second category. When determining whether message data should be categorized in the first or second categories, one metric that may be used is the similarity distance, which will quantify how closely message data resembles the features of each category. The process may begin by identifying and defining the features that best represent each category, including, for example, keywords, domain names, sender names and/or addresses, content structure, message contents such as product offerings, or the like. In some implementations, the identification and defining of features may be performed manually, while in other implementations autonomously via generative artificial intelligence or other machine learning techniques.

Once the features are identified, the similarity distance between the message data and each category may be calculated using a similarity metric. In some implementations, the similarity distance may be calculated using cosine similarity, which measures the cosine of the angle between two vectors representing the message data and the category features, or Euclidean distance, which computes the straight-line distance between the feature vectors in a multidimensional space. In some implementations, these calculations may be performed using algorithms implemented in machine learning engines or specialized engines, such as scikit-learn in Python. In such implementations where machine learning engines are implemented, the machine learning engine may be the same machine learning engine that is included in the categorization engine of block 306. In other implementations, the machine learning engine may be an additional machine learning engine to supplement the categorization engine of block 306.

After or before calculating the similarity distances, a predetermined threshold value may be established. This threshold determines whether the calculated similarity may be adequate for the message data to be considered part of a particular category (e.g., the first category or the second category). For example, if the similarity distance of the message data to the first category is below the predetermined threshold, the message data may be assigned to the first category. Alternatively, if the similarity distance of the message data is above the predetermined threshold (indicating less similarity between the message data and the features of the first category), the message data may be assigned to the second category.

In other implementations, a predetermined threshold may be set, then a first similarity distance between message data and the first category may be established, and a second similarity distance between the message data and the second category may also be established. If the similarity distance to a first category is below the predetermined threshold, and the similarity distance to the second category is above the predetermined threshold, the message data may be assigned to the first category (due to the similarity distance being smaller). If both similarity distances are below the threshold, the message data may be assigned to the closer category (i.e., the category to which the similarity distance is shorter). If both similarity distances exceed the threshold, the message data may be considered not to fit well within either category, which may necessitate the creation of a new category or a reevaluation of the existing ones.

In yet additional implementations, two predetermined thresholds may be determined: a first predetermined threshold related to the first category, and a second predetermined threshold related to the second category. If the similarity distance to a first category is below the first predetermined threshold, and the similarity distance to the second category is above the second predetermined threshold, the message data may be assigned to the first category (due to the similarity distance being smaller). If the similarity distance to the first category is above the first predetermined threshold, and the similarity distance to the second category is below the second predetermined threshold, the message data may be assigned to the second category for similar reasons. If both similarity distances are below their respective predetermined thresholds, the message data may be assigned to the closer category (i.e., the category to which the similarity distance is shorter). If both similarity distances exceed their respective thresholds, the message data may be considered to not fit well within either category, which may necessitate the creation of a new category or a reevaluation of the existing ones.

In some implementations, if both similarity distances exceed the threshold, the message data may be assigned to a preset category (chosen as either the first category, or second category) such that as a foundation, the message data may be treated with higher security standards (for example, by removing hyperlinks entirely). Alternatively, if both similarity distances exceed the threshold, the message data may be filtered out using a disposition identical to that which the coarse data filter implements, for example by quarantining the message data, placing it into a specialized folder, deleting the message data, or the like.

The threshold value(s) itself may be typically derived through empirical testing or based on domain expertise, and it may require iterative adjustments to optimize the accuracy of the categorization process. By refining both the features used in the similarity calculations and the threshold values, a more precise categorization can be achieved.

As previously described, based on the categorization determined, in some implementations, the categorization engine removes hyperlinks in the message data upon a condition where the message data may be in the first category. Similarly, in some implementations, the categorization engine alters hyperlinks in the message data upon a condition where the message data may be in the second category.

Continuing at block 312 the system 130 may apply metadata to the message data based on the category. The application of metadata of block 312 may occur at the gateway server. The metadata applied to the message data may serve one or more of various purposes. For one, the metadata may allow a malicious email filtering plug-in of an email exchange application (or in some implementations, the email exchange application itself) to move the message data to a storage location based on the metadata. For example, metadata that is applied to message data indicating that the message data is in the first or second category may result in the email exchange application (or malicious email filtering plug-in thereof) placing the message data into a predetermined folder, color coding the message data, and/or flagging the message data with a visual indication flag, or the like.

Additionally, or alternatively, the metadata applied to the message data may include information pertaining to the alteration or removal of hyperlink(s) therein. For example, if a hyperlink has been removed from the message data, metadata may indicate to the email exchange application (or malicious email filtering plug-in thereof) to display a banner or other message along with the message data when viewing the message data to indicate the removal of the hyperlink, and/or instructions for how to manually proceed to the website intended. As such, the banner may include the removed hyperlink itself.

Additionally, or alternatively, the system 130 may implement changes to the message data by altering hyperlink(s) of the message data. Accordingly, upon clicking of the altered hyperlink, the display of the endpoint device 140 displays a warning message via the malicious email filtering plug-in. To do so, metadata may be applied to the message data to signal to the endpoint device 140 to execute code directly on the endpoint device 140 via the email exchange application and/or a malicious email filtering plug-in of the email exchange application.

As such, in some implementations, any hyperlink in the message data may be altered to allow for the navigation to the target address safely through a safety protocol. The safety protocol may include the presenting of a pop-up message or banner upon clicking the hyperlink in the message, with the pop-up message containing at least one selectable button which may redirect the browser. Some implementations may include a selectable button that redirects the browser to the original destination of the hyperlink, identical to that which was first received at the gateway server. Alongside such a selectable button may be text or image(s) identifying that the hyperlink has been identified as belonging to malicious message data. Additionally, or alternatively, this text or image may include a reasoning as to why the message data has been determined to be malicious, as an output from the machine learning model 232. For example, the text or image may indicate that the domain from which the message data was received is associated with a high probability of malicious activity. As another example, the text or image may indicate that the hyperlink is associated with a domain or website with a high probability of malicious activity. In some implementations, the at least one selectable button may redirect the browser to a known predetermined benign website, for example a search engine or an intranet page of an entity.

In some implementations, the at least one selectable button may redirect the browser to a website dedicated to training the employee for how to detect malicious message data. In some implementations, the website may include a reproduction of the message data from which the user is being redirected, with content of the message data (e.g., sender address, title, hyperlink(s), image(s), and so forth) highlighted for analysis. Each piece of content of the message data may, when clicked on or hovered over via a mouse, may display predetermined tips or training information via the user interface, these tips or training information being specific to the piece of content. For example, if the sender address is hovered over, the predetermined tips or training information may provide common domains from which malicious activity is most likely to occur. Alongside this reproduction of the message data, there may be an additional button to dismiss the screen and instead continue to the website to which the hyperlink originally was intended, as received by the gateway server.

At block 314, in order to display the message data at an endpoint device 140, the system 130 may transmit the message data (with or without the metadata previously described) to an endpoint device 140 upon receiving a transmission request. As described herein, the endpoint device 140 may have an email exchange application having a malicious email filtering plug-in. The email exchange application may include a plurality of folders for storing and organizing emails, such as inbox, sent items, drafts, and custom user-defined folders. At block 316, the system 130 may cause to be displayed the message data in a predetermined folder of the email exchange application based on the category, which, as previously described, may be communication to the email exchange application via metadata.

It shall be appreciated that not all categorizations are accurate, and sometime message data may be inadvertently placed in an incorrect category. For example, the message data may have been better suited for the first category, but instead it was placed in the second category, or vice versa. Additionally, or alternatively, the message data may be completely benign, and the categorization engine should have categorized the message data as non-malicious. Alternatively, the message data may appear to be malicious, and the categorization engine mistakenly categorized the message data as non-malicious.

Accordingly, in some implementations, the process may continue at block 318 where the system 130 receives, at the malicious email filtering plug-in, a signal having a misclassification signal. This misclassification signal provides a technical improvement to the system 130, such that the machine learning model(s) of the system 130 may continuously adjust and improve accuracy over time. To do so, and as illustrated at block 320, the system 130 may append the message data with the misclassification signal. The misclassification signal may take the form of metadata, control flags, headers, and/or encapsulation.

The misclassification signal may include specifics provided by the malicious email filtering program. For example, as a result of clicking a button on the malicious email filtering program indicating the type of misclassification (wrong category, not malicious, and so forth), the indicated type of misclassification may be embedded in the misclassification signal.

At block 322, the system 130 may ingest, upon receiving the misclassification signal, the message data (and the associated misclassification signal) at the machine learning model 232 as new training data. In this way, the machine learning model 232 may be improved over time by integrating learning techniques based on the ongoing categorization of real-world message data.

As will be appreciated by one of ordinary skill in the art, the present disclosure may be implemented as an apparatus (including, for example, a system, a machine, a device, a computer program product, and/or the like), as a method (including, for example, an enterprise process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for electronic message data analysis and neutralization via machine learning, the system comprising:
   a processing device; and
   a non-transitory storage device containing instructions, when executed by the processing device, the instructions cause the processing device to perform the steps of:
   receive message data at a gateway server;
   analyze, using a coarse message data filter, the message data, and remove the message data upon a condition where the message data meets at least one coarse message data filter filtering condition;
   receive, upon a condition where the message data does not meet the at least one coarse message data filtering condition, the message data in a categorization engine, the categorization engine comprising a machine learning model;
   score, using the categorization engine, the message data based on contents of the message data;
   categorize, using the machine learning model, the message data in a category of malicious or non-malicious, wherein the machine learning model is configured to further categorize the message data categorized as malicious as being in a first category or a second category,
      wherein upon a first condition where the message data is in the first category, the categorization engine removes one or more hyperlinks in the message data,
      wherein upon a second condition where the message data is in the second category, the categorization engine alters one or more hyperlinks in the message data such that a hyperlink of the one or more hyperlinks, upon interaction therewith, presents a pop-up message comprising an indicator as to a reasoning that the message data was categorized as malicious, wherein the reasoning is an output from the machine learning model;
   apply metadata, at the gateway server, to the message data based on the category;

transmit, upon receiving a transmission request, the message data to an endpoint device comprising an email exchange application comprising a malicious email filtering plug-in; and display the message data in a predetermined folder of the email exchange application based on the category.

2. The system of claim 1, wherein the instructions further cause the processing device to perform the steps of:

receive, at the malicious email filtering plug-in, a signal comprising a misclassification signal;

append the message data with the misclassification signal; and ingest, upon receiving the misclassification signal, the message data at the machine learning model as new training data.

3. The system of claim 1, wherein further categorizing the message data categorized as malicious as being in the first category or the second category comprises comparing a similarity distance to a predetermined threshold for the first category and the second category.

4. The system of claim 1, wherein, upon clicking of the altered hyperlink, the instructions further cause the processing device to perform the steps of:

display a warning message via the malicious email filtering plug-in.

5. A computer program product for electronic message data analysis and neutralization via machine learning, the computer program product comprising a non-transitory computer-readable medium comprising code causing an apparatus to:

receive message data at a gateway server;

analyze, using a coarse message data filter, the message data, and remove the message data upon a condition where the message data meets at least one coarse message data filter filtering condition;

receive, upon a condition where the message data does not meet the at least one coarse message data filtering condition, the message data in a categorization engine, the categorization engine comprising a machine learning model;

score, using the categorization engine, the message data based on contents of the message data;

categorize, using the machine learning model, the message data in a category of malicious or non-malicious, wherein the machine learning model is configured to further categorize the message data categorized as malicious as being in a first category or a second category, wherein upon a first condition where the message data is in the first category, the categorization engine removes one or more hyperlinks in the message data, wherein upon a second condition where the message data is in the second category, the categorization engine alters one or more hyperlinks in the message data such that a hyperlink of the one or more hyperlinks, upon interaction therewith, presents a pop-up message comprising an indicator as to a reasoning that the message data was categorized as malicious, wherein the reasoning is an output from the machine learning model;

apply metadata, at the gateway server, to the message data based on the category;

transmit, upon receiving a transmission request, the message data to an endpoint device comprising an email exchange application comprising a malicious email filtering plug-in; and display the message data in a predetermined folder of the email exchange application based on the category.

6. The computer program product of claim 5, wherein the code further causes the apparatus to:

receive, at the malicious email filtering plug-in, a signal comprising a misclassification signal;

append the message data with the misclassification signal; and ingest, upon receiving the misclassification signal, the message data at the machine learning model as new training data.

7. The computer program product of claim 5, wherein further categorizing the message data categorized as malicious as being in the first category or the second category comprises comparing a similarity distance to a predetermined threshold for the first category and the second category.

8. The computer program product of claim 5, wherein, upon clicking of the altered hyperlink, the code further causes the apparatus to:

display a warning message via the malicious email filtering plug-in.

9. A method for electronic message data analysis and neutralization via machine learning, the method comprising:

receiving message data at a gateway server;

analyzing, using a coarse message data filter, the message data, and remove the message data upon a condition where the message data meets at least one coarse message data filter filtering condition;

receiving, upon a condition where the message data does not meet the at least one coarse message data filtering condition, the message data in a categorization engine, the categorization engine comprising a machine learning model;

scoring, using the categorization engine, the message data based on contents of the message data;

categorizing, using the machine learning model, the message data in a category of malicious or non-malicious, wherein the machine learning model is configured to further categorize the message data categorized as malicious as being in a first category or a second category, wherein upon a first condition where the message data is in the first category, the categorization engine removes one or more hyperlinks in the message data, wherein upon a second condition where the message data is in the second category, the categorization engine alters one or more hyperlinks in the message data such that a hyperlink of the one or more hyperlinks, upon interaction therewith, presents a pop-up message comprising an indicator as to a reasoning that the message data was categorized as malicious, wherein the reasoning is an output from the machine learning model;

applying metadata, at the gateway server, to the message data based on the category;

transmitting, upon receiving a transmission request, the message data to an endpoint device comprising an email exchange application comprising a malicious email filtering plug-in; and displaying the message data in a predetermined folder of the email exchange application based on the category.

10. The method of claim 9, the method further comprising:

receiving, at the malicious email filtering plug-in, a signal comprising a misclassification signal;

appending the message data with the misclassification signal; and ingesting, upon receiving the misclassification signal, the message data at the machine learning model as new training data.

11. The method of claim 9, wherein further categorizing the message data categorized as malicious as being in the first category or the second category comprises comparing a similarity distance to a predetermined threshold for the first category and the second category.

12. The method of claim 9, wherein, upon clicking of the altered hyperlink, the method further comprises:

displaying a warning message via the malicious email filtering plug-in.

\* \* \* \* \*